US010293495B2

United States Patent
Briot et al.

(10) Patent No.: US 10,293,495 B2
(45) Date of Patent: May 21, 2019

(54) LOAD-BALANCING DEVICE FOR ARTICULATED ARM, ASSOCIATED LOAD-HANDLING APPARATUS AND METHOD

(71) Applicants: Centre national de la recherche scientifique, Paris (FR); Ecole Centrale de Nantes, Nantes (FR); Institut National des Sciences Appliquées, Rennes (FR)

(72) Inventors: Sébastien Briot, Treillieres (FR); Vigen Arakelyan, Rennes (FR)

(73) Assignees: CENTRE NATIONAL DE LA RECHERCHE SCIENTIFIQUE, Paris (FR); ECOLE CENTRALE DE NANTES, Nantes (FR); INSTITUT NATIONAL DES SCIENCES APPLIQUÉES, Rennes (FR)

( * ) Notice: Subject to any disclaimer, the term of this patent is extended or adjusted under 35 U.S.C. 154(b) by 33 days.

(21) Appl. No.: 15/537,705

(22) PCT Filed: Dec. 18, 2015

(86) PCT No.: PCT/EP2015/080686
§ 371 (c)(1),
(2) Date: Nov. 28, 2017

(87) PCT Pub. No.: WO2016/097388
PCT Pub. Date: Jun. 23, 2016

(65) Prior Publication Data
US 2018/0126566 A1    May 10, 2018

(30) Foreign Application Priority Data
Dec. 19, 2014  (FR) .................................. 14 62980

(51) Int. Cl.
*F16M 11/00* (2006.01)
*B25J 19/00* (2006.01)
(Continued)

(52) U.S. Cl.
CPC ............. *B25J 19/0016* (2013.01); *B25J 9/06* (2013.01); *B25J 9/1065* (2013.01); *F16M 11/08* (2013.01);
(Continued)

(58) Field of Classification Search
CPC ............... F16M 11/10; F16M 11/2014; F16M 11/2021; F16M 11/08
(Continued)

(56) References Cited

U.S. PATENT DOCUMENTS 2,545,515 A   3/1951  Gannett et al.
4,598,601 A   7/1986  Molaug
(Continued)

FOREIGN PATENT DOCUMENTS

EP  1154109 A1  11/2011
FR  2533284 A1  3/1984
NL  1034141 C1  1/2009

OTHER PUBLICATIONS

International Search Report dated Feb. 24, 2016 during the prosecution of International Application No. PCT/EP2015/080686.

*Primary Examiner* — Steven M Marsh
(74) *Attorney, Agent, or Firm* — Troutman Sanders LLP

(57) ABSTRACT

The invention relates to a load-balancing device for an articulated arm capable of receiving a load having a weight, the balancing device being characterized in that it comprising a support system able to be fastened to a stationary element of the articulated arm, and an actuator element capable of being attached to a movable input element of the articulated arm, the balancing device also including a lever arm able to exert a force on the actuator element in order to apply said force on the input element of the articulated arm, (Continued)

the lever arm having an adjustable length as a function of the weight of the load.

8 Claims, 2 Drawing Sheets

(51) Int. Cl.
    *B25J 9/10*         (2006.01)
    *B25J 9/06*         (2006.01)
    *F16M 11/08*      (2006.01)
    *F16M 11/20*      (2006.01)
    *F16M 11/24*      (2006.01)

(52) U.S. Cl.
    CPC ......... *F16M 11/2092* (2013.01); *F16M 11/24* (2013.01); *F16M 2200/041* (2013.01); *F16M 2200/044* (2013.01); *F16M 2200/063* (2013.01)

(58) Field of Classification Search
    USPC ... 248/229.11, 226.11, 281.11, 284.1, 276.1, 248/278.1, 917, 919
    See application file for complete search history.

(56) References Cited

U.S. PATENT DOCUMENTS

| | | | |
|---|---|---|---|
| 4,753,128 A | 6/1988 | Bartett et al. | |
| 6,896,230 B2* | 5/2005 | Cvek | F16M 11/10 248/276.1 |
| 6,899,308 B2* | 5/2005 | Chow | F16F 15/28 248/282.1 |
| 8,585,001 B2* | 11/2013 | Huang | F16M 11/08 248/278.1 |
| 8,684,325 B1* | 4/2014 | Beshara | F16M 13/02 248/274.1 |
| 8,733,722 B2* | 5/2014 | Hung | F16M 13/02 248/123.11 |
| 9,133,982 B1* | 9/2015 | Valdez | F16M 13/022 |
| 9,863,574 B2* | 1/2018 | Lai | F16B 1/00 |
| 2003/0075658 A1* | 4/2003 | Beissel, Jr. | F16M 11/10 248/284.1 |
| 2004/0159757 A1* | 8/2004 | Pfister | F16M 11/10 248/284.1 |

* cited by examiner

LOAD-BALANCING DEVICE FOR ARTICULATED ARM, ASSOCIATED LOAD-HANDLING APPARATUS AND METHOD

CROSS REFERENCE TO RELATED APPLICATIONS

This application is a U.S. National Phase of International Patent Application No. PCT/EP2015/080686, filed Dec. 18, 2015, which claims priority to Foreign Application No. FR 1462980, filed Dec. 19, 2014, all of which are herein incorporated by reference in their entireties.

FIELD OF THE INVENTION

The present invention relates to a load-balancing device for an articulated arm able to receive a load having a weight, as well as an associated load-handling apparatus and method.

BACKGROUND

The invention applies to the field of load-handling arms, for example variable-load handling arms. Such arms are robotic or manual.

It is known to use articulated arms to handle loads. For example, in the case of robotic arms, such arms include a plurality of motors intended to actuate the various segments of the arm to move an effector intended to receive a load.

It is then known to equip such arms with balancing systems. Such balancing systems in particular aim to offset the gravitational force exerted on the arm, during load handling.

SUMMARY

When the weight of the load to be moved is variable, such balancing systems generally include a plurality of motors to compensate the variable gravitational forces exerted on the arm.

Nevertheless, such balancing systems are not fully satisfactory.

Indeed, the motors of said balancing systems generally have a high energy consumption, for example around ten kilowatts.

The presence of many motors in such systems further leads to a high cost.

Furthermore, such balancing systems are generally complex systems that require the implementation of computers for the real-time coordination of the operation of the balancing motors, for example during a load change during operation of the arm.

One aim of the invention is therefore to propose a less expensive balancing device that has a lower energy consumption, and is easier to operate.

To that end, the invention relates to a load-balancing device of the aforementioned type, including a support system able to be fastened to a stationary element of the articulated arm, and an actuator element able to be attached to a movable input element of the articulated arm, the balancing device further including a lever arm able to exert a force on the actuator element in order to apply said force on the input element of the articulated arm, the lever arm having an adjustable length as a function of the weight of the load.

Indeed, the lever arm is able to exert a force to compensate the weight of the load, said force depending on the weight of the load to be moved. The length of the lever arm being adjustable, it is not necessary to provide motors to provide continuous and real-time compensation for the weight of the load. The energy consumption and the cost of the balancing device are thus reduced.

According to other advantageous aspects of the invention, the balancing device includes one or more of the following features, considered alone or according to any technically possible combination:

the device further includes an energy storage system for storing at least part of the work of the force exerted by the lever arm on the actuator element, the energy storage system being able to be blocked to retain the energy stored in said storage system;

the support system includes a first sliding connection and a second sliding connection, a first part of the first sliding connection being connected to a first part of the second sliding connection, and secured to said first part of the second sliding connection, a second part of the second sliding connection, translatable relative to the first part of the second sliding connection being able to be fastened to the stationary element of the articulated arm;

the axis of the first sliding connection is perpendicular to the axis of the second sliding connection;

the energy storage system includes a free segment and a spring, one of the ends of the free segment being connected to a first end of the lever arm by a pivot link, a first end of the spring being connected at a first point to the free segment and a second end of the spring being connected at a second point to the lever arm.

Furthermore, the invention relates to a load-handling apparatus including an articulated arm, the articulated arm comprising a stationary element and a movable input element, the load-handling apparatus further including a balancing device as defined above, the support system of the balancing device being fastened to the stationary element of the articulated arm, and the actuator element of the balancing device being fastened to the input element of the articulated arm.

According to another advantageous aspect of the invention, the load-handling apparatus includes the following feature:

the articulated arm has an amplification factor p that is a function of the configuration of said articulated arm, and in that, when the balancing device compensates the weight exerted by the load on the articulated arm, the lever arm has a balancing length verifying the relationship:

$$p \cdot g \cdot m_P \cdot l_{LJ} = k \cdot l_{LR} \cdot l_{LS}$$

where g is the local gravity acceleration, $m_P$ is the weight of the load, k is the stiffness of the spring, $l_{LR}$ is the distance between the first point of the free segment and the pivot link, $l_{LS}$ being the distance between the second point of the lever arm and the pivot link.

Furthermore, the invention relates to a load-handling method implementing a handling apparatus as defined above, the method including a first balancing step comprising the following phases:

blocking the articulated arm;
blocking the energy storage system;
unblocking the support system;
fastening a load to an effector of the articulated arm;

modifying the length of the lever arm to achieve the balancing length associated with the load.

According to another advantageous aspect of the invention, the method further includes a step for moving the load including the following phases:
unblocking the articulated arm;
unblocking the energy storage system;
blocking the lever arm at the balancing length associated with the load;
blocking the second sliding connection of the support system.

BRIEF DESCRIPTION OF THE DRAWINGS

The invention will be better understood using the following description, provided solely as a non-limiting example and done in reference to the appended drawings, in which.

DETAILED DESCRIPTION

Figure 1:
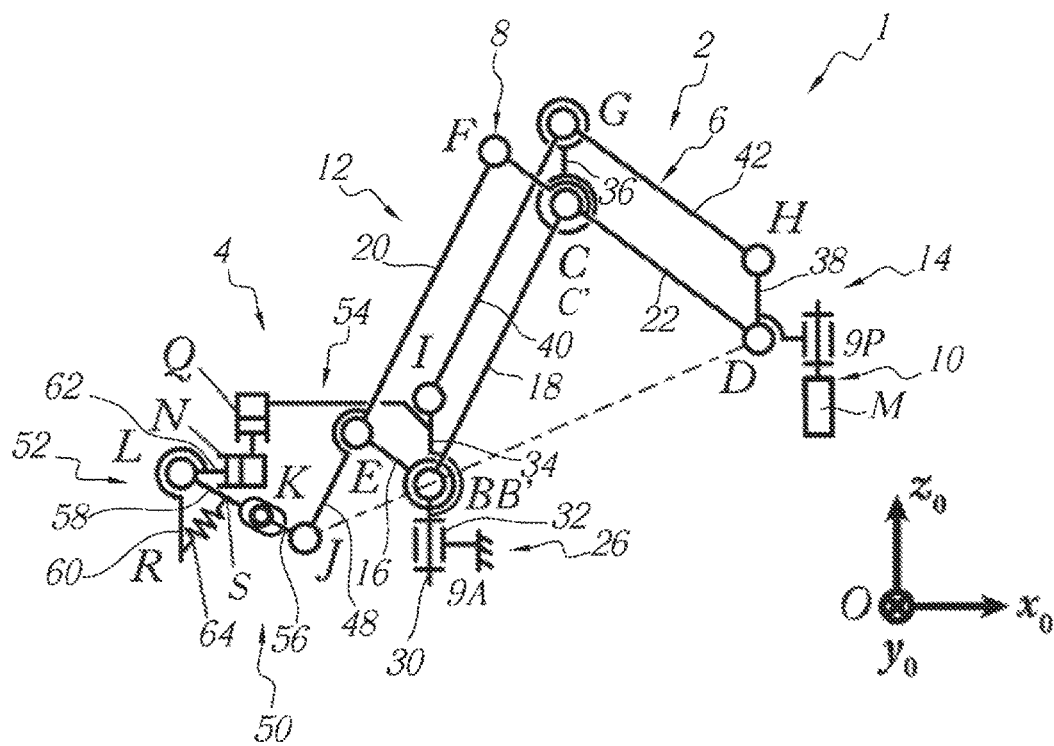
FIG. 1 is a schematic illustration of a load-handling apparatus according to the invention.

A handling apparatus 1 according to the invention is shown in FIG. 1.

The handling apparatus 1 includes an articulated arm 2 and a balancing device 4.

The handling apparatus 1 is shown in an orthonormal reference (O, $x_0$, $y_0$, $z_0$).

The plane created by the vectors $x_0$, $y_0$ is also called "horizontal plane".

The plane created by the vectors $x_0$, $z_0$ is also called "vertical plane".

The direction of the vector $y_0$ is also called "horizontal axis".

The direction of the vector $z_0$ is also called "vertical axis".

The articulated arm 2 and the balancing device 4 each include a plurality of rigid segments 6. Each segment 6 extends along a corresponding axis. Each segment 6 includes a first end and a second end, separate from the first end.

The axes of the segments 6 of the articulated arm 2 and the balancing device 4 belong to the vertical plane.

The segments 6 are connected to one another by pivot links 8, the axis of which is the horizontal axis, and which are also called "horizontal links".

The articulated arm 2 also includes pivot links 9A, 9P, the axis of which is the vertical axis, and which are also called "vertical links".

The articulated arm 2 further comprises an effector 10.

The effector 10 is able to receive, or in other words capable of receiving, a load M, M' to be moved.

The effector 10 of the articulated arm 2 has four degrees of freedom, namely translational along each of the axes of the reference, and a rotation around the vertical axis.

Advantageously, the articulated arm 2 is statically balanced.

"Statically balanced arm" refers to a system that remains immobile in the position in which it has been placed. In particular, for a motorized arm, the arm is said to be "statically balanced" if it remains immobile in the position in which it has been placed when the motors that it includes do not apply any force on said arm.

For example, the articulated arm 2 is statically balanced by one or several counterweights and/or by one or several springs.

The segments 6 of the articulated arm 2 form, with an actuating segment 48 described later, a pantograph 12. Furthermore, the segments 6 form a double parallelogram 14.

As illustrated by FIG. 1, the pantograph 12 includes a proximal support arm 16 and a distal support arm 18. Furthermore, the pantograph 12 includes an input segment 20 and an output arm 22.

The proximal support arm 16, the distal support arm 18, the input segment 20 and the output arm 22 are segments 6.

The proximal support arm 16, the distal support arm 18, the input segment 20 and the output arm 22 are connected to one another by horizontal connections 8, denoted E, B, B', C and F, respectively.

The axis of the connection B' is combined with the axis of the connection B, and secured to said axis of the connection B.

The intersection of the axes of the horizontal connections E, B, C and F with the vertical plane forms a parallelogram EBCF.

The parallelogram EBCF is such that the segment of the proximal support 16 and the axis of the output arm 22 are parallel. Furthermore, the parallelogram EBCF is such that the segment of the distal support segment 18 and the axis of the input segment 20 are parallel.

More specifically, a second end of the proximal support arm 16 is connected to a chassis of the horizontal connection B. Furthermore, a first end of the distal support arm 18 is connected to a chassis of the horizontal connection B'.

A first end of the input segment 20 is connected to a first end of the proximal support arm 16 by the horizontal connection E.

A second end of the input segment 20 is connected to a first end of the output arm 22 by the horizontal connection F.

A second end of the distal support arm 18 is connected to an intermediate point of the output arm 22 by the horizontal connection C.

Furthermore, and as described later, a second end of the actuating segment 48 is secured to the input segment 20 to form an input arm of the pantograph 12.

Figure 2:
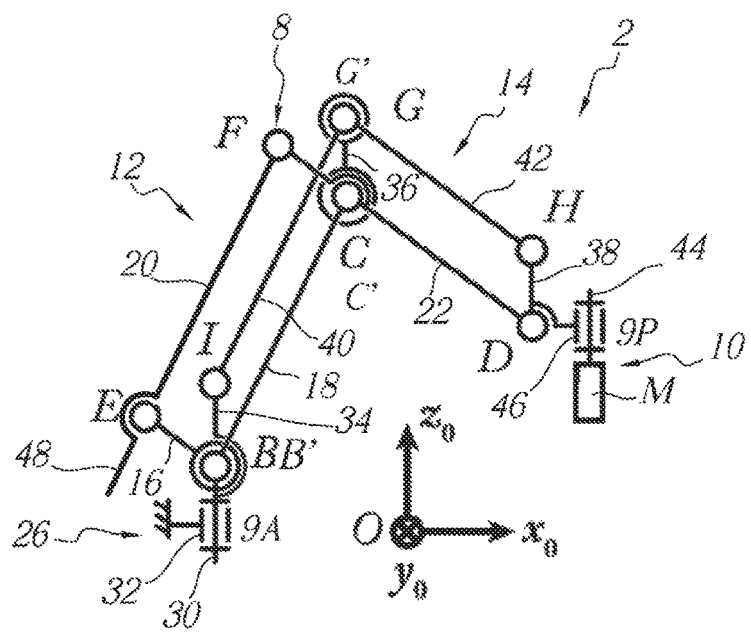
FIG. 2 is a schematic illustration of part of the apparatus of FIG. 1.

As illustrated by FIG. 2, the pantograph 12 is positioned such that, when idle, the connection B is the lowest horizontal connection 8 of said pantograph 12, and the connection F is the highest horizontal connection 8 of said pantograph 12.

Part of the horizontal connection B, preferably the chassis of the horizontal connection B, is connected to a housing 26 via the vertical pivot link 9A. Furthermore, part of the horizontal connection B', preferably the chassis of the horizontal connection B', is connected to the housing 26 via the vertical pivot link 9A.

More specifically, part, preferably the chassis, of each horizontal connection B, B' is secured to an axis 30 of the vertical connection 9A. Furthermore, a chassis 32 of the vertical connection A, rotatable around the axis 30, is secured to the housing 26. The horizontal connections B, B' of the pantograph 12 are thus stationary relative to the housing 26.

The horizontal connection B of the pantograph 12 forms a support element of the pantograph 12, able to receive, or in other words suitable for receiving, the forces transmitted by the proximal and distal support arms 18, 20, and retransmitting said forces to the chassis 26.

The double parallelogram 14 includes a first vertical segment 34, a second vertical segment 36, a third vertical segment 38, a first connecting segment 40 and a second connecting segment 42, which are segments 6.

The first vertical segment 34, the second vertical segment 36, the first connecting segment 40 and the distal support arm 18 are connected to one another by horizontal connections 8, denoted I, G and C'.

The axis of the connection C' is combined with the axis of the connection C, and secured to said axis of the connection C.

The projection of the axes of the segments 18, 34, 36 and 40 over the vertical plane forms a first parallelogram IBCG.

The first connecting segment 40 is arranged such that the projection of the corresponding axis over the vertical plane is situated between the projections over said vertical plane of the axes associated with the input segment 20 and the distal support arm 18, respectively.

More specifically, a first end of the first vertical segment 34 is connected to a first end of the first connecting segment 40 by the horizontal connection I.

A second end of the first vertical segment 40 is connected to a first end of the second vertical segment 36 by the horizontal connection G.

A second end of the second vertical segment 36 is connected to the intermediate point of the distal support arm 18 by the horizontal connection C'.

Furthermore, a second end of the first vertical segment 34 is secured to the axis 30 of the vertical connection A, the axis of the first vertical segment 34 then being a vertical axis.

The first vertical segment 34 thus forms a stationary element of the articulated arm 2.

The axis of the second vertical segment 36 is thus also the vertical axis.

Furthermore, the second vertical segment 36, the output arm 22, the third vertical end 38 and the second connecting arm 42 are connected to one another by horizontal connections 8, denoted D, H, G', and by the connection C' previously described.

The axis of the connection G' is combined with the axis of the connection G, and secured to the axis of the connection G.

The intersection of the axes of the horizontal connections G', C', D and H with the vertical plane forms a second parallelogram GCDH.

More specifically, the first end of the second vertical segment 36 is connected to a first end of the second connecting segment 42 by the horizontal connection G'.

A second end of the second connecting segment 42 is connected to a first end of the third vertical segment 38 by the horizontal connection H.

A second end of the third vertical segment 38 is connected to a second end of the output arm 22 by the horizontal connection D.

The axis of the third vertical segment 38 is thus also the vertical axis.

The effector 10 is connected to the third vertical segment 38 via the vertical connection 9P.

More specifically, the effector 10 is secured to an axis 44 of the vertical connection 9P. Furthermore, a chassis 46 of the vertical connection 9P, rotatable around the axis 44, is secured to the third vertical segment 38.

Thus, the double parallelogram 14 is proper to keep, or in other words adapted to keep the axis 44 of the connection 9P parallel to the vertical axis during the operation of the articulated arm 2.

The balancing device 4 includes an actuating segment 48, a lever arm 50, an energy storage system 52 and a support system 54. The balancing device further includes a motor (not shown).

The lever arm 50 has a variable and adjustable length to reach a selected operating length for balancing a load with a given weight.

As illustrated in FIG. 1, the lever arm 50 includes a first segment 56 and a second segment 58, connected to one another by a sliding connection K, such that the axes of the first segment 56 and the second segment 58 are parallel, advantageously combined.

More specifically, a first end of the first segment 56 is connected to a first part of the sliding connection K, and a second end of the second segment 58 is connected to a second part of the sliding connection K that is translatable relative to the first part of the sliding connection K.

The motor is able to act, or in other words capable of acting, on the segment 56, 58 to adjust the length of the lever arm 50.

The support system 54 is able to support, or in other words capable of supporting, the actuating segment 48, the lever arm 50 and the energy storage system 52.

The support system 54 includes a sliding connection N and a sliding connection Q. A first part of the sliding connection N is connected to a first part of the sliding connection Q, and secured to said first part of the sliding connection Q.

The axis of the sliding connection Q is the vertical axis. Furthermore, the axis of the sliding connection N is parallel to the direction of the vector $x_0$.

A second part of the sliding connection Q, translatable relative to the first part of the sliding connection Q, is secured to the first vertical segment 34. In particular, the sliding connection Q bears the weight of the lever arm 50, the energy storage system 52 and the other elements of the support system 54.

Advantageously, the balancing device 4 comprises a unit (not shown) for compensating the weight borne by the sliding connection Q, i.e., for compensating the weight of the lever arm 50 of the energy storage system 52 and other elements of the support system 54.

The energy storage system 52 comprises a free segment 60, a support segment 62 and a spring 64.

A first end of the free segment 60 is secured to a first end of the support segment 62, such that the axes associated with the free segment 60 and the support segment 62 are orthogonal, the axis of the free segment 60 being a vertical axis.

A second end of the support segment 62 is further secured to a second part of the sliding connection K, translatable relative to the first part of the sliding connection K.

Furthermore, the first end of the support segment 62 is connected by a horizontal connection L to a first end of the second segment 58 of the lever arm 50.

The spring 64 has a stiffness k.

Preferably, the spring 64 is a spring of the "linear spring" type, i.e., a spring whose length without load is zero. Such a linear spring allows perfect balancing of the weight of the variable load supported by the articulated arm 2. Such a spring is traditionally known. Different embodiments of a linear spring are known. For example, such a spring is made using pulleys and belts.

Alternatively, the spring 64 is a spring whose length without load is non-zero.

The spring 64 includes a first end and a second end.

A first end of the spring 64 is fastened to the free segment 60 at a point R. Furthermore, a second end of the spring 64 is fastened to the second segment 58 of the lever arm 50 at a point S.

A first end of the actuating segment 48 is connected by a horizontal connection J to a second end of the first segment 56 of the lever arm 50.

Furthermore, a second end of the actuating segment 48 is secured to the input segment 20. Preferably, the axis of the actuating segment 48 is combined with the axis of the input segment 20. The actuating segment 48 is fastened to the input segment 20 such that the horizontal connection E is located between the horizontal connections J and F.

The balancing device 4 further includes brakes (not shown) for independently blocking the sliding connections K, N, Q and the horizontal connection L.

Subsequently, the point of intersection of the axis of a horizontal connection 8 with the vertical plane will be designated using the reference of said horizontal axis 8.

The point J of the horizontal connection J forms an input point J. Furthermore, the point D of the horizontal connection D forms an output point D.

The actuating segment 48 has a length such that the input point J, the output point D and the point B of the horizontal connection B are aligned.

Advantageously, the points J, L and S are aligned.

The articulated arm 2 and the balancing device 4 are such that the movement of the input point J of a vector $\vec{v}$ results in a movement of the output point D of a vector $-p\vec{v}$, where p is called "amplification factor" and is defined by:

$$p = \frac{l_{EB}}{l_{CD}} \quad (1)$$

with $l_{EB}$ the distance between the points E and B and $l_{CD}$ the distance between the points C and D.

The actuating segment 48 thus forms an actuator element of the balancing device 4.

Furthermore, the input segment 20 an input element of the articulated arm 2.

The operation of the handling apparatus 1 will now be described.

Figure 3:
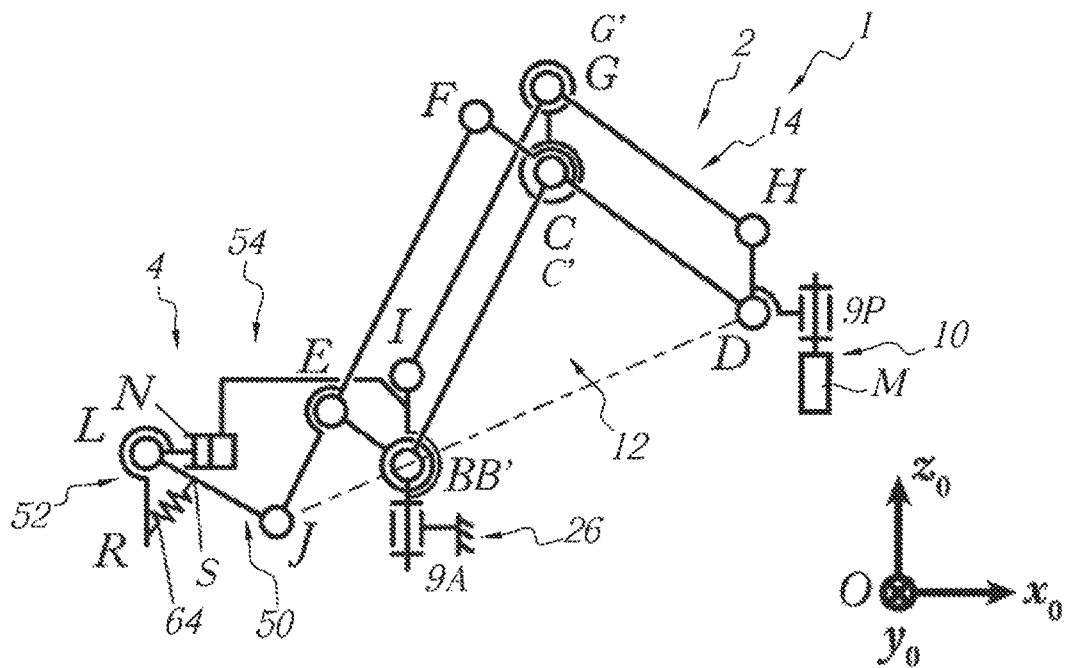
FIG. 3 is a schematic illustration of the handling apparatus of FIG. 1, during a first load-handling step.

As illustrated by FIG. 3, during a first operating step of the handling apparatus 1, the articulated arm 2 supports a first load M with weight $m_P$ that is fastened to the effector 10.

A gravitational force with norm $m_P \cdot g$ and oriented downward is exerted on the effector 10, therefore on the output point D, g being the local gravity acceleration.

During the first operating step, the balancing device 4 is such that the handling apparatus 1 is balanced.

The sliding connection K is blocked, such that the length of the lever arm 50 is fixed.

Furthermore, the sliding connection Q is blocked, such that the position of the first part of the sliding connection N is stationary relative to the point B.

In the first operating step, the balancing device 4 exerts, on the input point J, a force that compensates the weight of the first load M that is applied on the output D. Thus, a force with norm $p \cdot m_P \cdot g$ oriented downward is exerted on the input point J.

The weight of the output point D being compensated, the length of the lever arm 50 verifies the following relationship:

$$p \cdot g \cdot m_P \cdot l_{LJ} = k \cdot l_{LR} \cdot l_{LS} \quad (2)$$

The length $L_{LJ}$ is then called "balancing length".

In a known manner, the potential energy of the balancing device 4 is equal, to within a constant, to:

$$V_{tot_m} = p \cdot g \cdot m_P \cdot l_{LJ} \cos \varepsilon + \frac{1}{2} \cdot k \cdot (l_{LR}^2 + l_{LS}^2 - 2 \cdot l_{LR} \cdot l_{LS} \cos \varepsilon) \quad (3)$$

where $\varepsilon$ is the value of the angle $\widehat{RLJ}$.

Relationship (3), combined with relationship (2), indicates that the total energy $V_{tot_m}$ is constant, irrespective of the value of the angle $\varepsilon$, i.e., irrespective of the position of the input point J, therefore irrespective of the position of the output point D and the effector 10. Thus, the articulated arm 2 is proper to move, or in other words adapted to move the effector 10 without intruding energy to compensate the weight of the first load M.

The articulated arm 2 is next maneuvered to move the load M, for example to bring the first load M to an unloading point.

Such a maneuver is possible because the horizontal connection L and the sliding connection N are unblocked and allow the movement of the input point J in the vertical plane.

The movements of the output point D drive, via the input point J, the variation of the length of the spring 64.

Thus, during the movement of the load M, the spring 64 stores or releases part of the work of the force applied on the lever arm 50 at the input point J.

During a second operating step of the handling apparatus 1, the articulated arm 2 and the balancing device 4 are configured to replace the first load M with weight $m_P$ with a second load M' with weight $m'_P$ different from the weight $m_P$.

Figure 4:
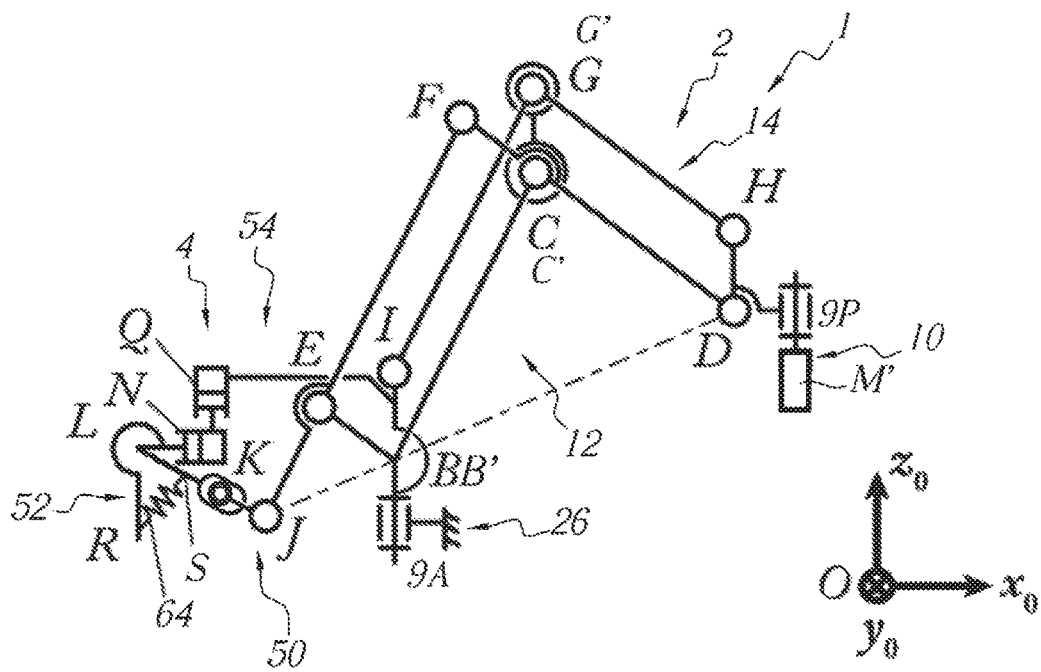
FIG. 4 is a schematic illustration of the handling apparatus of FIG. 1, during a second successive step following the step of FIG. 3.

To that end, the horizontal connections B, B' are blocked, as shown in FIG. 4. In this case, the position of the output point D cannot vary. Consequently, the position of the input point J also cannot vary.

The horizontal connection L of the balancing device is also blocked, such that the length of the spring 64 is kept fixed. The horizontal connection L being blocked, the energy of the spring 64 is preserved and does not dissipate.

Furthermore, the sliding connections K and Q are unblocked.

The second load M' is fastened to the effector 10 to replace the first load M.

Then, the motor of the lever arm 50 is actuated and the length of the lever arm 50 is modified such that the new length $l'_{LJ}$ of the lever arm 50 verifies the relationship:

$$p \cdot g \cdot m'_P \cdot l'_{LJ} = p \cdot g \cdot m_P \cdot l_{LJ} \quad (4)$$

Such a length variation of the lever arm 50 is possible because the two sliding connections N and Q are unblocked.

Alternatively, an operator modifies the length of the lever arm 50 manually.

Advantageously, the axis of the sliding connection N is perpendicular to the axis of the sliding connection Q. Thus, when the connection L is blocked, the variation of the length of the lever arm 50 leads to a movement of the first end of the second segment 58 that can be broken down into two independent translations along the vertical axis and the axis parallel to the direction of the vector $x_0$. The perpendicularity of the axes of the connections N and Q allows a better transmission of the movement of the first end of the second segment 58 and a better transmission of the internal forces.

A force oriented downward and with norm $p \cdot m'_P \cdot g$ is thus applied to the point J.

The new total energy of the balancing device 4 is equal to:

$$V'_{tot_m} = p \cdot g \cdot m'_P \cdot l'_{LJ} \cos \varepsilon + \tfrac{1}{2} \cdot k \cdot (l_{LR}^2 + l_{LS}^2 - 2 \cdot l_{LR} \cdot l_{LS} \cdot \cos \varepsilon) \quad (5)$$

Yet according to relationships (2) and (4), the new length $l'_{LJ}$ of the lever arm 50 verifies the following relationship:

$$p \cdot g \cdot m'_P \cdot l'_{LJ} = k \cdot l_{LR} \cdot l_{LS} \quad (6)$$

Consequently, the new total energy of the balancing device 4 is equal to:

$$V'_{tot_m} = p \cdot g \cdot m_P \cdot l_{LJ} \cos \varepsilon + \tfrac{1}{2} \cdot k \cdot (l_{LR}^2 + l_{LS}^2 - 2 \cdot l_{LR} \cdot l_{LS} \cdot \cos \varepsilon) = V_{tot_m} \quad (7)$$

The total energy of the compensating device 4 therefore has not varied during the replacement of the first load M with the second load M'.

To manipulate the load M', the connections of the articulated arm 2 are next unblocked. Furthermore, the sliding connections K and Q are blocked. The handling apparatus 1 is then in a configuration similar to the configuration of FIG. 1.

Alternatively, the lever arm 50 has no motor. The variation of the length of the lever arm 50 is then ensured by a motor equipping one of the sliding connections K or Q.

Advantageously, the load-balancing device according to the invention is able to operate for loads with a variable weight, with a single motor and a single spring.

Alternatively, the articulated arm 2 does not include a pantograph. The articulated arm 2 has an amplification factor p that is a function of the configuration of said articulated arm 2. In this case, when the balancing device 4 compensates the weight exerted by the load M, M' on the articulated arm 2, the lever arm 50 has a balancing length $l_{LJ}$ verifying the relationship:

$$p \cdot g \cdot m_P \cdot l_{LJ} = k \cdot l_{LR} \cdot l_{LS}$$

where g is the local gravity acceleration, $m_P$ is the weight M of the load, k is the stiffness of the spring 64, $l_{LR}$ is the distance between the first point R of the free segment 60 and the pivot link L, $l_{LS}$ being the distance between the second point S of the lever arm 50 and the pivot link L.

In such an embodiment, a balancing length $l_{LJ}$ is for example set for a first value of the amplification factor p corresponding to a first configuration of the articulated arm 2. The balancing of the articulated arm 2, for the configurations of the articulated arm 2 having an amplification factor different from the first amplification factor p, is imperfect, but nevertheless leads to a lower energy consumption than for an articulated arm of the state of the art.

Thus, the balancing device 4 allows an operation of the articulated arm 2 leading to a minimal energy expenditure, for example during the movement of variable loads. The balancing device 4 according to the invention therefore makes it possible to save energy consumed by the articulated arm 2.

The invention claimed is:

1. A load-balancing device for an articulated arm able to receive a load having a weight, the balancing device comprising:
    a support system fastened to a stationary element of the articulated arm, wherein the support system comprises a first sliding connection and a second sliding connection, a first part of the first sliding connection being connected to a first part of the second sliding connection, and secured to said first part of the second sliding connection, a second part of the second sliding connection, translatable relative to the first part of the second sliding connection, being able to be fastened to the stationary element of the articulated arm,
    an actuator element attached to a movable input element of the articulated arm, and
    a lever arm able to exert a force on the actuator element in order to apply said force on the input element of the articulated arm, the lever arm having an adjustable length as a function of the weight of the load.

2. The device according to claim 1, further comprising an energy storage system storing at least part of the work of the force exerted by the lever arm on the actuator element, the energy storage system being able to be blocked to retain the energy stored in said storage system.

3. The device according to claim 1, wherein an axis of the first sliding connection is perpendicular to an axis of the second sliding connection.

4. The device according to claim 2, wherein the energy storage system comprises a free segment and a spring, one of the ends of the free segment being connected to a first end of the lever arm by a pivot link, a first end of the spring being connected at a first point to the free segment and a second end of the spring being connected at a second point to the lever arm.

5. A load-handling apparatus including an articulated arm, the articulated arm comprising a stationary element and a movable input element, the handling apparatus comprising a balancing device according to claim 1, the support system of the balancing device being fastened to the stationary element of the articulated arm, and the actuator element of the balancing device being fastened to the input element of the articulated arm.

6. The apparatus according to claim 5, wherein the articulated arm has an amplification factor p that is a function of the configuration of said articulated arm, and in that, when the balancing device compensates the weight exerted by the load on the articulated arm, the lever arm has a balancing length verifying the relationship:

$$p \cdot g \cdot m_P \cdot l_{LJ} = k \cdot l_{LR} \cdot l_{LS}$$

where g is the local gravity acceleration, $m_P$ is the weight of the load, k is the stiffness of the spring, $l_{LR}$ is the distance between the first point of the free segment and the pivot link, $l_{LS}$ being the distance between the second point of the lever arm and the pivot link.

7. A load-handling method implementing a load-handling apparatus according to claim 6, comprising a first balancing step comprising the following phases:
    blocking the articulated arm;
    blocking the energy storage system;
    unblocking the support system;
    fastening a load to an effector of the articulated arm; and
    modifying the length of the lever arm to achieve the balancing length associated with the load.

8. The load-handling method according to claim 7, further comprising a step of moving the load including the following phases:
    unblocking the articulated arm;
    unblocking the energy storage system;
    blocking the lever arm at the balancing length associated with the load; and
    blocking the second sliding connection of the support system.

* * * * *